United States Patent
Smith

(10) Patent No.: US 10,163,094 B2
(45) Date of Patent: Dec. 25, 2018

(54) LIGHT-LIFE SYSTEM AND APPLICATION

(71) Applicant: Nathaniel D. Smith, Chicago, IL (US)

(72) Inventor: Nathaniel D. Smith, Chicago, IL (US)

( * ) Notice: Subject to any disclaimer, the term of this patent is extended or adjusted under 35 U.S.C. 154(b) by 496 days.

(21) Appl. No.: 14/707,049

(22) Filed: May 8, 2015

(65) Prior Publication Data

US 2016/0328697 A1   Nov. 10, 2016

(51) Int. Cl.
*G06Q 20/32* (2012.01)
*G06Q 50/12* (2012.01)
*G06Q 30/02* (2012.01)
*G06Q 30/06* (2012.01)
*G06Q 10/08* (2012.01)

(52) U.S. Cl.
CPC ..... *G06Q 20/3224* (2013.01); *G06Q 10/0875* (2013.01); *G06Q 30/0226* (2013.01); *G06Q 30/0633* (2013.01); *G06Q 50/12* (2013.01)

(58) Field of Classification Search
USPC ................ 705/14.27, 26.1, 21, 15; 340/4.42
See application file for complete search history.

(56) References Cited

U.S. PATENT DOCUMENTS

| | | | | |
|---|---|---|---|---|
| 2011/0199180 A1* | 8/2011 | Holman | ................. | G08C 17/00 340/4.42 |
| 2011/0270662 A1* | 11/2011 | Rocco | .................... | G06Q 30/02 705/14.27 |
| 2012/0059729 A1* | 3/2012 | Roa | ......................... | G06Q 30/02 705/26.1 |
| 2015/0287006 A1* | 10/2015 | Hunter | ................... | H04L 67/28 705/21 |

\* cited by examiner

*Primary Examiner* — Hajime Rojas
*Assistant Examiner* — Reva R Danzig
(74) *Attorney, Agent, or Firm* — Ingenium Patents LLC; Peter R. Kramer

(57) ABSTRACT

A system including the use of beacon technology to track and better serve users/customers through the use of a mobile application. This allows a venue location the ability to balance user/customer wait times at their location and provide marketing, processing, and information to the user/customer. The system is used to locate users/customers and process user payments thereby reducing wait lines at venues to a fraction of the time compared to normal processes, which may allow venues to drive more sales during peak times. As the user/customer walks about a venue location, information such as where the user/customer is located and what products and services are available at that venue location is displayed on the user's client device.

12 Claims, 5 Drawing Sheets

LIGHT-LIFE SYSTEM AND APPLICATION

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to a Light-Life Application. More particularly, the invention relates to an all-encompassing venue mobile application that provides the ability to process payments and provide additional customer services through Geo-fencing and beacon identifying technologies.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that the prior art presupposes the use of offering loyalty and marketing programs, along with payment processing combined with fraud protection capabilities. Other aspects of the prior art offer logistics and software that allows a user to make payments and place orders from their smart phone or computer devices. By way of educational background, another aspect of the prior art generally useful to be aware of is that the prior art presupposes the use of beacon technology and geo fencing to track mobile devices.

In view of the forgoing, it is believed that such approaches may not include, or be able to provide, an application that offers an all in one services platform that solves problems of high cost and lack of connectivity. It is contemplated that a geo fencing and beacon technology framework may integrate all of these systems into one mobile application, while providing all venues the ability to communicate with all customers across all environments while providing a seamless way to process, contact and better serve customers, with useful information, awareness and online presence.

In view of the foregoing, it is clear that these traditional techniques are not perfect and leave room for more optimal approaches.

Figure 1:
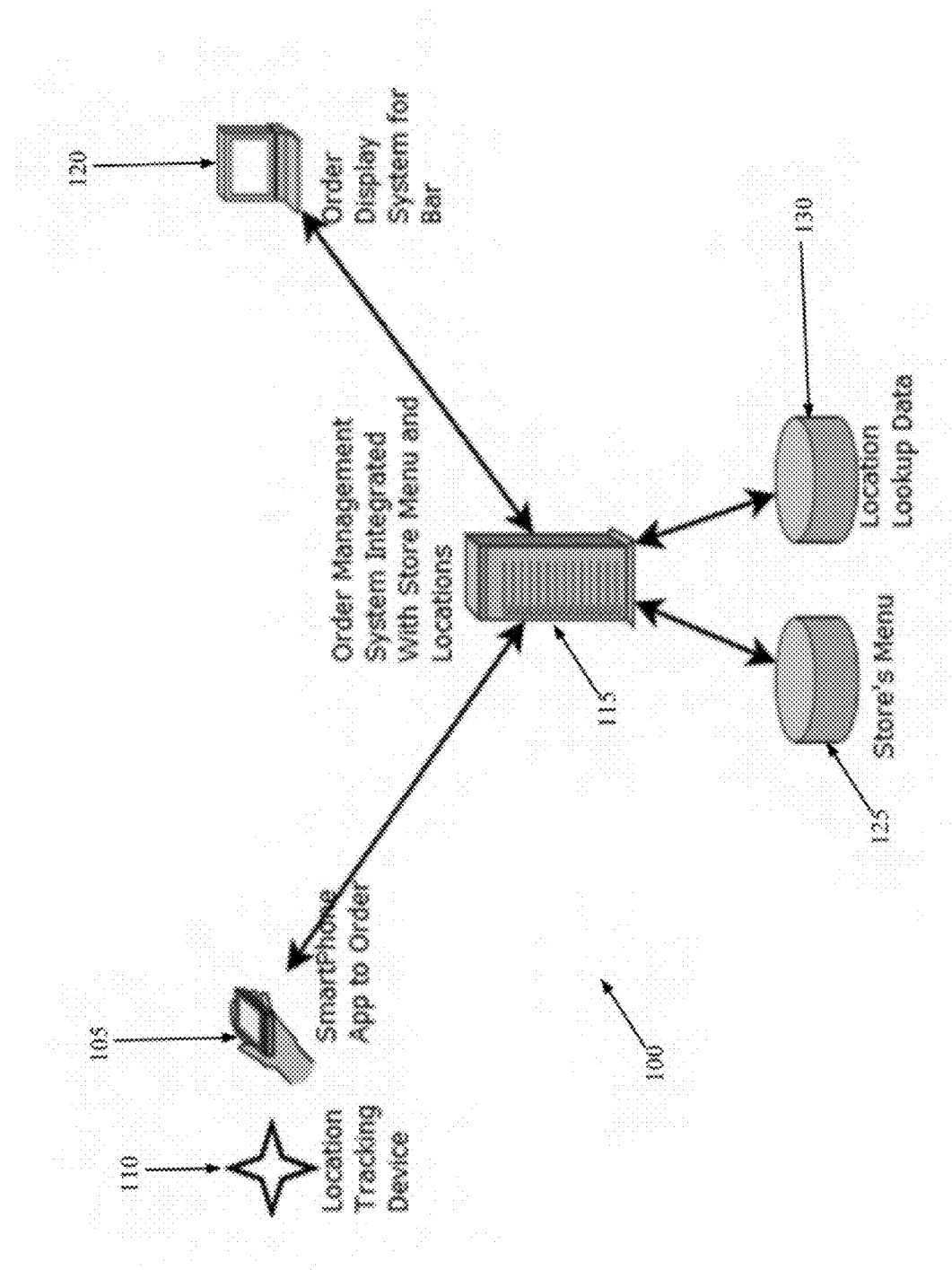
FIG. 1 illustrates a detailed perspective view of an exemplary Life-Light Application, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, un-recited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

The present invention will now be described in detail with reference to embodiments thereof as illustrated in the accompanying drawings.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application. When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/ features. Thus, other embodiments of the present invention need not include the device itself.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The Light-Life Application may be used to relieve long waiting lines at venues, poor customer service, lack of information on products or the locations of products or services, and location awareness utilizing beacon and marketing technologies. The essential backbone, or fundamental core property, of the Light-Life Application is the use of beacon technology to track and better serve customers through the use of a mobile, or computing, software application. The use of beacon and marketing technologies deployed on mobile and computing devices may allow venues the ability to balance customer wait times at their location and may also provide marketing, processing, and information to the user. The Light-Life application may be used to locate users and process user payments thereby reducing wait lines at venues to a fraction of the time compared to normal processes, which may allow venues to drive more sales during peak times; which in return provides better customer service to the user. The venue utilizing the Light-Life Application may have the ability to restore the fun into coming into a physical store, or venue location, by providing updated products with location data and new informational messages to the user as the user moves about the venue. Thus the store will have a way to communicate to customers via mobile devices.

The Light-Life Application may offer and provide a connective atmosphere through the use of beacon technologies combined with mobile phones to a venue or individual in order to connect with their customers at any location. The application may perform payment processing, and provide all services through use of an Information Technology (IT) Company to provide user friendly services and products to customers, who with ease may press, or touch prompts on their mobile device to access information on various services and products.

Utilizing beacon technologies to connect customers to a venues online store while they are in the venue location may allow the venue to provide all products and services to the customer. The Light-Life application may allow users the ability to process payments and orders on their own with access to the venue data, thereby reducing customer wait times by prioritizing customers who have paid by mobile device, and subsequently relaying this demographical information to the venue. With the use of beacon technology, the venue will know where the user requested the service or product and will be able to deliver the request. The venue may be able to set zones for services, marketing, and even venue information on products and services.

The Light-Life Application may be developed through agile development and testing cycle processes to ensure all features and implementations perform successfully. The agile development and testing cycle's processes includes geo-fencing and software debugging which may allow the Light-Life Application to work as designed for all venues of all sizes including any multiplicity of floors. The Light-Life Application may be extremely easy to install and configure, such that beacon sensors may be sent directly to your store and configured to your venue. The venue may be sent an email/text link to download the Light-Life Application from your perspective device, along with instructions on how to configure the application to your liking. Training may also be provided for the new system following the delivery of the application. Core features of Light-Life Application may be available for our launch date in the third quarter of 2015. Additional services will be available following months after.

The application may run on all mobile platforms that have the ability to access our beacons. Venues and users may set service zones or trigger actions when entering in a geographical area. Light-Life Application system may also be used outside in large open spaces as long as our beacons are available. As the user walks about the store or area, information such as where the specific user is located and what products and services are available at that location may be displayed on the user's mobile device. Users may also have the ability to scan products and receive information about pricing and actions they can take.

Light-Life Application was designed with a type of venue location map or device that is able to locate itself in an open space. In utilizing beacon technology, we are able to map out venues and set zones in order to connect all users to a connected atmosphere. Light-Life Application may be able to address the users cases, whereby users only need to enter their information and turn on the application in order to be granted access to products and services that can be delivered either with or without QR codes or table numbers, whereby, it should be appreciated that the methods employed provide an increase in users mobile phone battery life by reducing the amount of drainage.

The Light-Life Application may incorporate a low cost alternative to employing an IT Department for all your technical needs, and also provide increased customer sales and volume, higher demands and sales volumes through mobile payments, and increased productivity through record keeping and customer order tracking.

The Light-Life Application may incorporate Geo-fencing to allow venues to find and/or deliver goods and services to customers efficiently by providing real time targeting of customers and marketing. The Light-Life Application may provide improved customer experiences, customer service and customer knowledge-base while also incorporating helpful data to drive sales with the use of key satisfaction metrics. Other added benefits of the Light-Life Application may include, for example, without limitation, fraud reduction capabilities, higher sales volumes through faster customer order processing, driving and retaining loyal clientele, geo-fencing, venue analytics, and a connected atmosphere comprising customers, services representatives, peers, social networks, and POS systems.

The user/customer may need to download the application and give the Light-Life Application access to the device functions through the use of mobile application and beacon technology. Light-Life Application may send information to the user/customer when they are either searching for a product at a location or want a product delivered to their location. The user may also receive information about products and services at that location. The user/customer may also scan bar codes using their mobile devices to get additional information on individual products. User/Customers may also make requests for services at the location they are at and send messages to friends and groups/users at the venue including set zones to meet or service zones.

User/Customers may have a profile and be able to upload media files to the Light-Life Application and also have access to the social media market. User/Customers may keep media private or share with friends on the application.

As the User/Customer moves about, they obtain settings that may allow the users to search for our beacon or to sleep. These services may be used and calculated in business logic with the use of our application. With the addition of beacon technology, Light-Life Application may be able to have different triggers set by geo-fencing. Any combination of Light-Life Application includes our services incorporating and using algorithms and business logic for B2B. Light-Life Application may be singly packaged as a mobile application to include what venues and business are looking for and can afford within an Information Technology Company. The user may open the Light-Life Application and as they walk into a venue; the application will update with the services of the venue they are currently in. The user along with the venue may set service zones or zones where friends can meet, or gift products or services from the application, as well as send messages to peers in a location, or to peers in another location. The user/customer may send queried information regarding their favorite song(s)/media to be requested from a DJ, whereby the DJ may have a connection with listeners or user/customers.

Light-Life Application may comprise a multiplicity of objectives for improving response time for customer questions, improving upon weaknesses in upsell/cross-sell volumes, enhancing buying experiences, and providing world class marketing and IT solutions using geo-fencing with personalized alerts, increasing customer behavioral knowledge, and venue analytics. Light-Life Application may also comprise a multiplicity of objectives for reducing time to close and process sales, rapid training for staff on the new application system, and providing effective loyalty programs, and cross platform access which includes IOS, Android, Windows Phone and Blackberry, as well as providing reduction of fraud with ID's, by way of example and not limitation, lost customer ID's, and payment forms. The Light-Life Application may provide a connected environment and an enhanced relationship with bartenders, servers, DJ's and fellow peers.

The Light-Life Application platform may create a geo-fence in a venue. The application platform may provide more services to a business by relaying information and processing payments efficiently with the uses of data. Other variations of Light-Life Application may be venues who attempt to add some creative features or services to an existing platform, with the uses of beacon technology. Light-Life Application user/customers may move about as the application updates products and services while the user changes locations. Light-Life Application may give user/customers the ability to track any person or product location.

It is contemplated that proposed pricing for Light-Life Application are estimates for the services discussed, and not a warranty of final pricing. Estimates may be subject to change if project specifications are changed or costs for outsourced services change before a contract is executed. The Light-Life Application may incorporate pricing that may include the following packaged services:

Package One—Open/Close tabs, Process Payments, Remote Server, Bar Massager, and Gift Drinks, Social Media access to all networks including the Night-Life and Location Awareness with geo fencing.

Package Two—The services provided in Package One plus Loyalty Programs, Mobile Marketing and Inventory Tracking.

Package Three—The services provided in Packages One and Two, plus Bar Analytics.

FIG. 1 illustrates a detailed perspective view of an exemplary Life-Light Application, in accordance with an embodiment of the present invention. In one embodiment, the Life-Light Application 100 comprises a smartphone application 105 which incorporates a location tracking device 110 by which user's purchase. A integrated order management system server 115 may comprise, for example, without limitation, a store or venue menus and locations. An order display system 120 may be incorporated at the venue location to allow personnel to view user's purchases or requests, thereby allowing efficient and timely processing of customer order requests. The integrated order management system server 115 may comprise integrated functions to include for example, without limitation, a store's menu 125 and location lookup data 130 thereby allowing a user to access smartphone application 105 and view venue menus and location data.

Figure 2A:
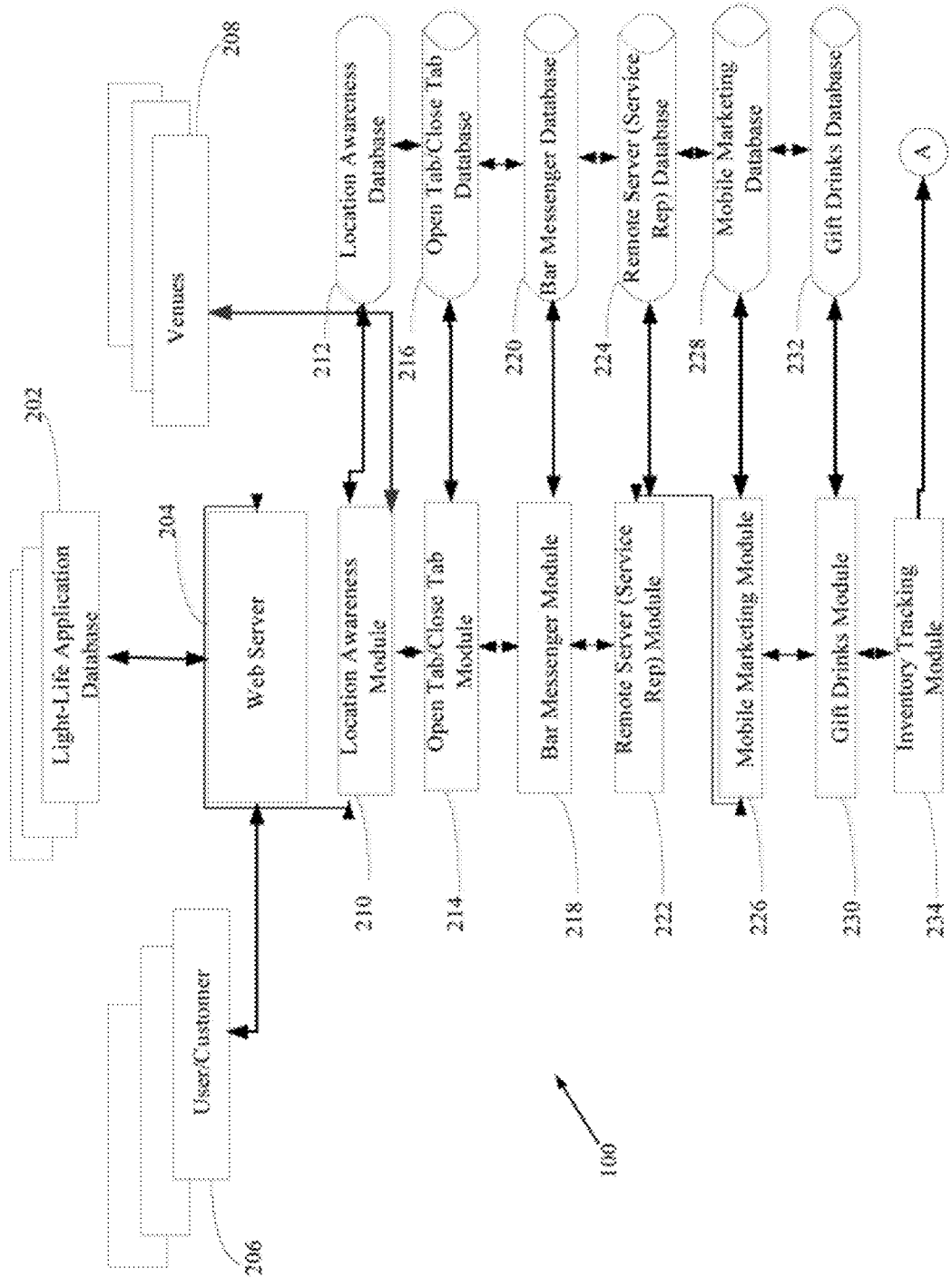
FIGS. 2A and 2B illustrate an exemplary software module architecture of a system for a Light-Life Application platform that enables the delivery of necessary products and services, in accordance with an embodiment of the present invention.
Figure 2B:
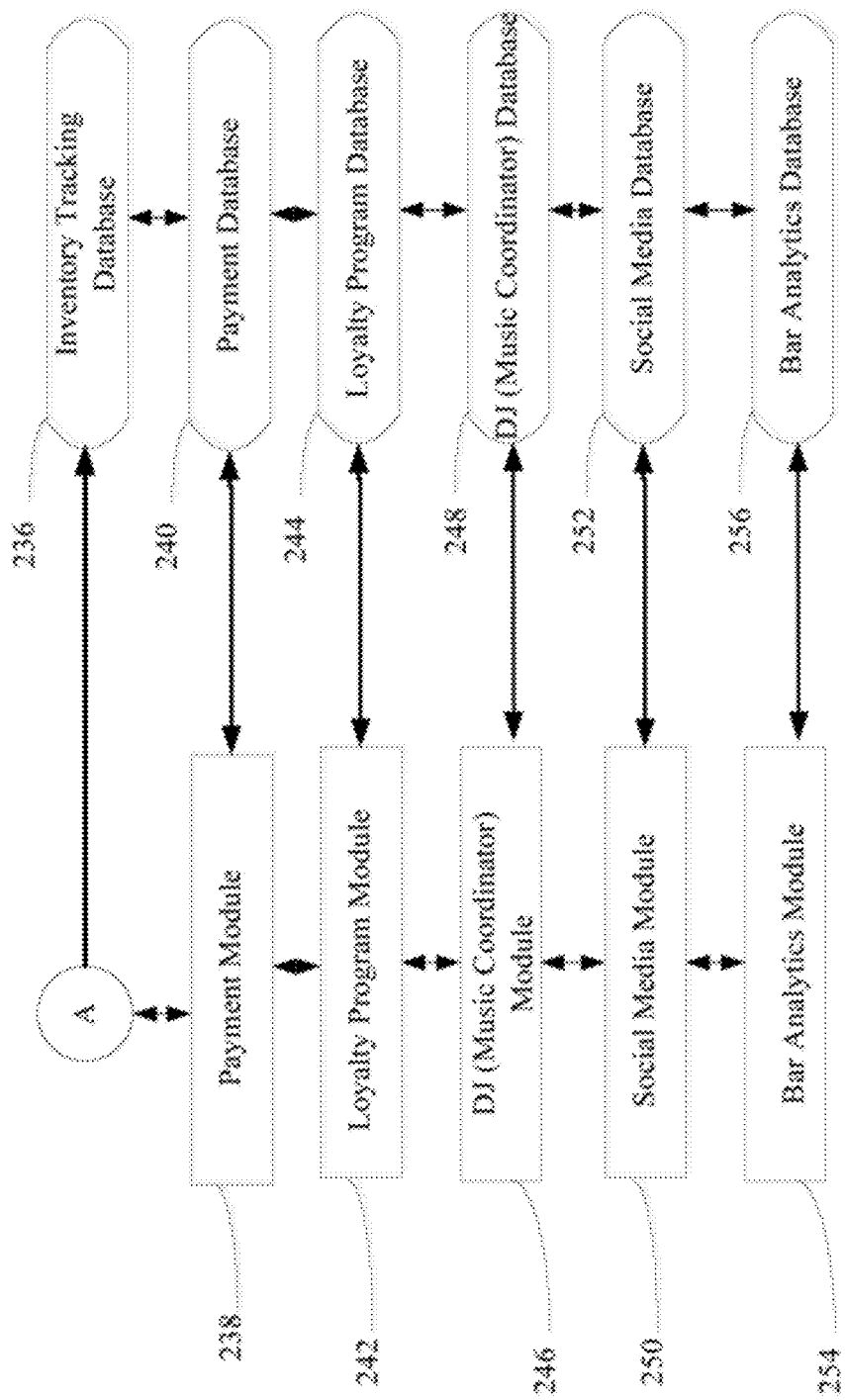

FIGS. 2A and 2B illustrate an exemplary software module architecture of a system for a Light-Life Application platform that enables the delivery of necessary products and services, in accordance with an embodiment of the present invention. Referring now to FIG. 2A, Life-Light Application 100 may comprise a Life-Light Application Database 202 connected to Web Server 204 to allow User/Customer 206 and Venues 208 to access the Light-Life Application platform for products, services, and location data. Web Server 204 may interact with a Location Awareness Module 210 which may allow a venue to track users and establish connections with them. The Location Awareness Module 210 may track customers and notify them when they exit a service zone, and may also close tabs automatically when the user leaves a service zone, is inactive for a predetermined period of time, or logs out of the Light-Life Application 100. Users may be able to, for example, without limitation, locate friends, create groups, set service zones, and place settings for closing tabs. Location Awareness Database 212 may save for example, without limitation, the locations of friends, created groups, set service zones, and place settings for closing tabs.

In some embodiments, an Open Tab/Close Tab Module 214 may provide a service that allows a venue to process customer's requests who order products at, for example, without limitation, a bar, a restaurant, or venue's store, which may include a list of different types of alcoholic drinks, specials, top drinks, food, and recently placed orders from that specific venue and/or other products tailored to the venue's market. In addition, information may be added and removed by each individual venue. The application will update the menu if the User/Customer 206 changes location to another venue. In addition, card information, profile information, and a picture may be displayed including a random symbol when delivering products. Users may be able to scan a bar code on the back of their ID, or enter required information, to order drinks or food. This information may be saved within an Open Tab/Close Tab Database 216.

In some embodiments, User/Customer 206 may also be able to create a profile and send requests/gifts to friends via a Bar Messenger Module 218, which may utilize any plurality of payment processing procedures. A Bar Messenger Database 220 may store order request results and have the ability to recognize specific User/Customer 206 purchase request histories. This service includes an application messenger where User/Customer 206 may message or geographically find fellow friends, peers, or associates at a location utilizing Location Awareness Module 210 and Location Awareness Database 212. Bar Messenger Database 220 may also provide, for example, without limitation, capabilities to locate peers and send custom messages when a party arrives to a location, or sending notifications directly through the Light-Life Application 100. User/Customer 206 may also be able to create a profile and send requests to friends to download the Light-Life Application 100 and/or receive gift drinks, or gift food items.

In some embodiments, Light-Life Application 100 may comprise a Remote Server (Service Rep) Module 222 which may provide a service that uses location awareness to allow Venues 208 to locate a User/Customer 206 who makes a request for products or services; and track the User/Customer 206 down to a locational measurement based upon feet through their cell phone signal GPS/Blue-tooth transmissions. In utilizing these services, if needed, the Venue 208 may assign service location zones via Location Awareness Module 210. All open/close tab services are displayed, User Profile and Order information including random symbols when delivering. May allow Venues 208 to use Location Awareness Module 210, to locate a User/Customer 206 who makes a request, to track the user down to an accuracy of, for example, without limitation, a vicinity of 2-5 feet via the User/Customer 206 mobile phone GPS/Blue-tooth transmissions.

In some embodiments, Light-Life Application 100 may comprise a Mobile Marketing Module 226 which may provide a service that allows Venues 208 to send messages to User/Customer 206 in real time about services, promotion's and even venue information. This information may also be integrated and used with Location Awareness Module 210 and Location Awareness Database 212. A Mobile Marketing Database 228 may save information a User/Customer 206 likes, or dislikes, based upon User/Customer feedback responses to Mobile Marketing Module 226.

In some embodiments, Light-Life Application 100 may comprise a Gift Drinks Module 230 which may provide a service that allows Light-Life Application users to send other User/Customer 206 drinks through a profile name or user name. Profile information may be displayed, or not displayed, whereby users may have the option to turn on/off the ability to send drinks or receive drinks Gift Drinks Module 230 may also add any purchased products to the User/Customer 206 tab.

In some embodiments, Light-Life Application 100 may comprise an Inventory Tracking Module 234 which may allow bar tenders and server rep to notate which items are out of stock or need to be restocked at the bar or venue. The Inventory Tracking Module 234 may comprise a preloaded list of drinks and/or products that either displays different types of hard liquor, for example, without limitation, a mobile liquor store. This feature may update itself, for example, without limitation, every day, and display items that currently available as well as items that are out of stock, or greyed out. The Inventory Tracking Module 234 may also provide recommendations on what a User/Customer 206 should try based off Venue suggestions, should a specific drink or product be unavailable, or if a User/Customer 206 would like to try something different, or make a recommendation to a friend. User/Customer 206 may also scan, or take pictures, or query products to search for or find information on the location or information of the product(s) available, tailored to the venue's market.

Referring now to FIG. 2B, in some embodiments, Light-Life Application 100 may comprise a Payment Module 238 which may provide a service that allows User/Customer 206 to enter their card information and pay for their tab and/or buy products. The Payment Module 238 service may be accessed across the Light-Life Application 100 and may also include the User/Customer 206 profile information which may allow other User/Customers to identify users they know or whom they are looking for. A Payment Database 240 may provide records of past purchases to User/Customer 206.

In some embodiments, Light-Life Application 100 may comprise a Loyalty Program Module 242 which may provide a service that gives the Venues 208 access to an awards program whereby User/Customer's 206 can earn points at their location and other locations as well based upon, for example, without limitation, frequency of visits to a venue, amount of purchases, or the amount of referrals provided or in app games such as, trivia or bar games. All User/Customer's 206 may be defaulted into the Light-Life Application 100 Loyalty Program if the Venue does not opt into their own Loyalty Program. These points may be used to redeem products and services from the Blue Nova Technology, LLC providing Light-Life Application 100 or from the Venues 208.

In some embodiments, Light-Life Application 100 may comprise a DJ (Music Coordinator) Module which may provide a service that allows the Venues 208 to connect all User/Customer's 206 to the DJ for purposes of requesting songs, as well as ranking songs. User/Customer 206 may be able to query, and/or upload media to a database whereby they may also send messages to the DJ. This information is sent to the DJ whose profile is shown to users logged into Light-Life Application 100.

In some embodiments, Light-Life Application 100 may comprise aSocial Media Module 250 which may allow users to post messages to their favorite social media site and also allow the ability to upload media files to the Light-Life Application 100. This feature may also create threads within the application where a User/Customer 206 can share media files with any multiplicity users. These media files may be uploaded to all social media sites if the User/Customer allows it. The Light-Life Application 100 Social Media Module 250 may allow User/Customer's 206 to keep all media files on the Light-Life Application 100 through the Social Media Database 252, unless allowed to post to other social media sites, thereby creating a separate social media avenue for User/Customers who want to share this information, but privately store them in a separate location.

In some embodiments, Light-Life Application 100 may comprise a Bar Analytics Module 254 which may provide the venue data on the interworking's and atmosphere at their location. Bar Analytics Module 254 may provide information on sales and orders to assist a Venue location to actively manage sales and traffic. Bar Analytics Module 254 may also provide details as to what type of services and products User/Customers 206 demand. Loyalty program information and marketing information may also be available. With the use of Inventory Tracking, the Bar Analytics Module 254 may assist in restocking items that are out of stock, and keep track of and save all product inventory and information within a Bar Analytics Database 256.

Figure 3:
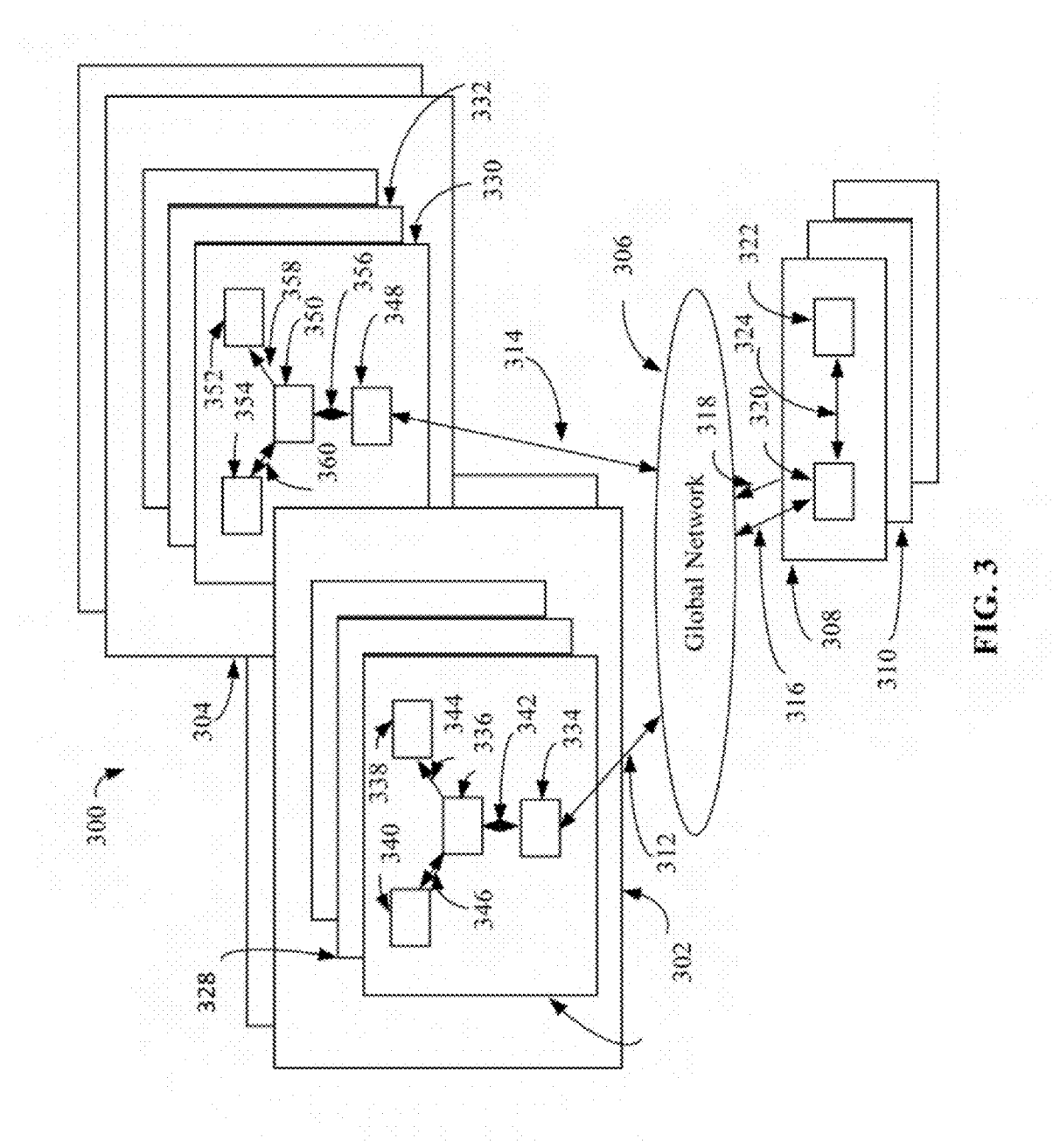
FIG. 3 illustrates an exemplary software module architecture of a system for a Light-Life application depicting a conventional client/server communication system, in accordance with an embodiment of the present invention.

FIG. 3 illustrates an exemplary software module architecture of a system for a Light-Life application depicting a conventional client/server communication system, in accordance with an embodiment of the present invention.

In one embodiment, communication system 300 includes a multiplicity of networked regions with a sampling of regions denoted as a network region 302 and a network region 303, a global network 306 and a multiplicity of servers with a sampling of servers denoted as a server device 308 and a server device 310.

In the present embodiment, network region 302 and network region 304 may operate to represent a network contained within a geographical area or region. Non-limiting examples of representations for the geographical areas for the networked regions may include postal zip codes, telephone area codes, states, counties, cities and countries. Elements within network region 302 and 304 may operate to communicate with external elements within other networked regions or within elements contained within the same network region.

In one embodiment, global network 306 may operate as the Internet. It will be understood by those skilled in the art that communication system 300 may take many different forms. Non-limiting examples of forms for communication system 300 include local area networks (LANs), wide area networks (WANs), wired telephone networks, cellular telephone networks or any other network supporting data communication between respective entities via hardwired or wireless communication networks. Global network 306 may operate to transfer information between the various networked elements.

In one embodiment, server device 308 and server device 310 may operate to execute software instructions, store information, support database operations and communicate with other networked elements. Non-limiting examples of software and scripting languages which may be executed on server device 308 and server device 310 include C, C++, C# and Java.

In one embodiment, network region 302 may operate to communicate bi-directionally with global network 306 via a communication channel 312. Network region 304 may operate to communicate bi-directionally with global network 306 via a communication channel 314. Server device 308 may operate to communicate bi-directionally with global network 306 via a communication channel 316. Server device 310 may operate to communicate bi-directionally with global network 306 via a communication channel 318. Network region 302 and 304, global network 306 and server devices 308 and 310 may operate to communicate with each other and with every other networked device located within communication system 300.

In one embodiment server device 308 includes a networking device 320 and a server 322. Networking device 320 may operate to communicate bi-directionally with global network 306 via communication channel 316 and with server 322 via a communication channel 324. Server 322 may operate to execute software instructions and store information.

In one embodiment, network region 302 includes a multiplicity of clients with a sampling denoted as a client 326 and a client 328. Client 326 includes a networking device 334, a processor 336, a GUI 338 and an interface device 340. Non-limiting examples of devices for GUI 348 include monitors, televisions, cellular telephones, smartphones and PDAs (Personal Digital Assistants). Non-limiting examples of interface device 340 include pointing device, mouse, trackball, scanner and printer. Networking device 334 may communicate bi-directionally with global network 306 via communication channel 312 and with processor 336 via a communication channel 342. GUI 338 may receive information from processor 336 via a communication channel 344 for presentation to a user for viewing. Interface device 340 may operate to send control information to processor 336 and to receive information from processor 336 via a communication channel 346. Network region 304 includes a multiplicity of clients with a sampling denoted as a client 330 and a client 332. Client 330 includes a networking device 348, a processor 350, a GUI 352 and an interface device 354. Non-limiting examples of devices for GUI 338 include monitors, televisions, cellular telephones, smartphones and PDAs (Personal Digital Assistants). Non-limiting examples of interface device 340 include pointing devices, mousse, trackballs, scanners and printers. Networking device 348 may communicate bi-directionally with global network 306 via communication channel 314 and with processor 350 via a communication channel 356. GUI 352 may receive information from processor 350 via a communication channel 358 for presentation to a user for viewing. Interface device 354 may operate to send control information to processor 350 and to receive information from processor 350 via a communication channel 360.

For example, consider the case where a user interfacing with client 326 may want to execute a networked application. A user may enter the IP (Internet Protocol) address for the networked application using interface device 340. The IP address information may be communicated to processor 336 via communication channel 346. Processor 336 may then communicate the IP address information to networking device 334 via communication channel 342. Networking device 334 may then communicate the IP address information to global network 306 via communication channel 312. Global network 306 may then communicate the IP address information to networking device 320 of server device 308 via communication channel 316. Networking device 320 may then communicate the IP address information to server 322 via communication channel 324. Server 322 may receive the IP address information and after processing the IP address information may communicate return information to networking device 320 via communication channel 324. Networking device 320 may communicate the return information to global network 306 via communication channel 316. Global network 306 may communicate the return information to networking device 334 via communication channel 312. Networking device 334 may communicate the return information to processor 336 via communication channel 342. Processor 396 may communicate the return information to GUI 398 via communication channel 344. User may then view the return information on GUI 338.

Figure 4:
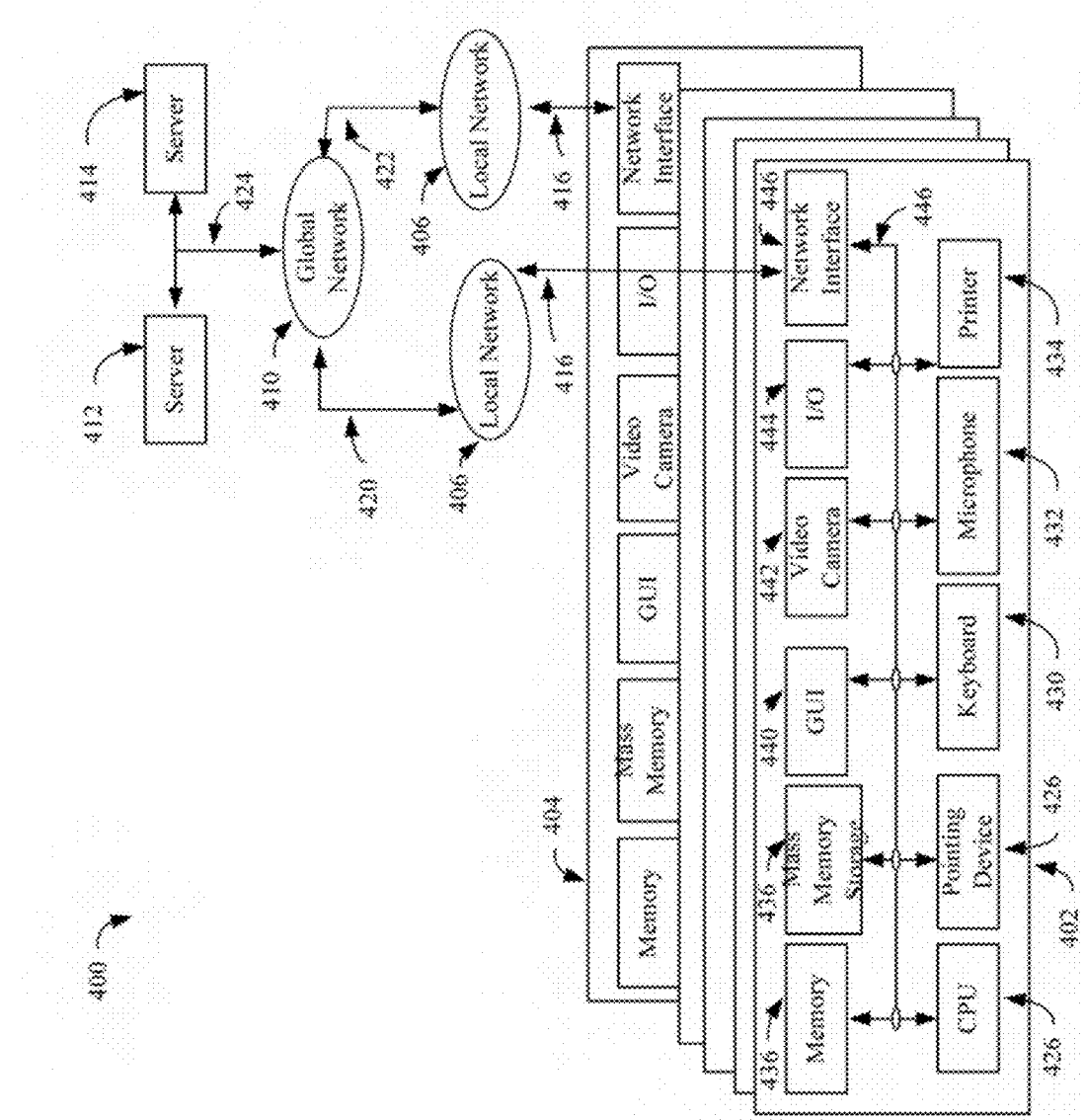
FIG. 4 illustrates an exemplary general computer software module architecture of a system for a Light-Life application for a web-enabled/networked application platform by which a client/server system may be used, in accordance with an embodiment of the present invention.

FIG. 4 illustrates an exemplary general computer software module architecture of a system for a Light-Life application for a web-enabled/networked application platform by which a client/server system may be used, in accordance with an embodiment of the present invention.

In one embodiment, Communication system 400 includes a multiplicity of clients with a sampling of clients denoted as a client 402 and a client 404, a multiplicity of local networks with a sampling of networks denoted as a local network 406 and a local network 408, a global network 410 and a multiplicity of servers with a sampling of servers denoted as a server 412 and a server 414.

In one embodiment, Client 402 may communicate bi-directionally with local network 406 via a communication channel 416. Client 404 may communicate bi-directionally with local network 408 via a communication channel 418. Local network 406 may communicate bi-directionally with global network 410 via a communication channel 420. Local network 408 may communicate bi-directionally with global network 410 via a communication channel 422. Global network 410 may communicate bi-directionally with server 412 and server 414 via a communication channel 424. Server 412 and server 414 may communicate bi-directionally with each other via communication channel 424. Furthermore, clients 402, 404, local networks 406, 408, global network 410 and servers 412, 414 may each communicate bi-directionally with each other.

In one embodiment, global network 410 may operate as the Internet. It will be understood by those skilled in the art that communication system 400 may take many different forms. Non-limiting examples of forms for communication system 400 include local area networks (LANs), wide area networks (WANs), wired telephone networks, wireless networks, or any other network supporting data communication between respective entities.

In one embodiment, Clients 402 and 404 may take many different forms. Non-limiting examples of clients 402 and 404 include personal computers, personal digital assistants (PDAs), cellular phones and smartphones.

In one embodiment, Client 402 includes a CPU 426, a pointing device 428, a keyboard 430, a microphone 432, a printer 434, a memory 436, a mass memory storage 438, a GUI 440, a video camera 442, an input/output interface 444 and a network interface 446.

CPU 426, pointing device 428, keyboard 430, microphone 432, printer 434, memory 436, mass memory storage 438, GUI 440, video camera 442, input/output interface 444 and network interface 446 may communicate in a unidirectional manner or a bi-directional manner with each other via a communication channel 448. Communication channel 448 may be configured as a single communication channel or a multiplicity of communication channels.

In one embodiment, CPU 426 may be comprised of a single processor or multiple processors. CPU 426 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 436 is used typically to transfer data and instructions to CPU 426 in a bi-directional manner. Memory 436, as discussed previously, may include any suitable computer-readable media, intended for data storage, such as those described above excluding any wired or wireless transmissions unless specifically noted. Mass memory storage 438 may also be coupled bi-directionally to CPU 426 and provides additional data storage capacity and may include any of the computer-readable media described above. Mass memory storage 438 may be used to store programs, data and the like and is typically a secondary storage medium such as a hard disk. It will be appreciated that the information retained within mass memory storage 438, may, in appropriate cases, be incorporated in standard fashion as part of memory 436 as virtual memory.

In one embodiment, CPU 426 may be coupled to GUI 440. GUI 440 enables a user to view the operation of computer operating system and software. CPU 426 may be coupled to pointing device 428. Non-limiting examples of pointing device 428 include computer mouse, trackball and touchpad. Pointing device 428 enables a user with the capability to maneuver a computer cursor about the viewing area of GUI 440 and select areas or features in the viewing area of GUI 440. CPU 426 may be coupled to keyboard 430. Keyboard 430 enables a user with the capability to input alphanumeric textual information to CPU 426. CPU 426 may be coupled to microphone 432. Microphone 432 enables audio produced by a user to be recorded, processed and communicated by CPU 426. CPU 426 may be connected to printer 434. Printer 434 enables a user with the capability to print information to a sheet of paper. CPU 426 may be connected to video camera 442. Video camera 442 enables video produced or captured by user to be recorded, processed and communicated by CPU 426.

In one embodiment, CPU 426 may also be coupled to input/output interface 444 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

In yet another embodiment, CPU 426 optionally may be coupled to network interface 446 which enables communication with an external device such as a database or a computer or telecommunications or internet network using an external connection shown generally as communication channel 416, which may be implemented as a hardwired or wireless communications link using suitable conventional technologies. With such a connection, CPU 426 might receive information from the network, or might output information to a network in the course of performing the method steps described in the teachings of the present invention.

Those skilled in the art, in light of the present teachings, will readily recognize that the steps described in the previous process may be performed in a different order and in some cases steps may be omitted or added. For example, without limitation, some embodiments may not implement an identifying sequence, but rather a generation sequence. Also, the user may be asked to create a password at the same time that the account is created rather than later in the process. In alternative embodiments, the software can be installed to send verifying documentation data to the server, and the user can interact with the system without setting up a username and password on the web site or mobile application.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation: recommended vendor action services via social media combined with vendor/operator management programs which result in vendor-customer satisfaction and return business, vendor management of a plurality of suppliers and distributors, network planning, design, optimization, and integration and applications support services to deliver innovative customer solutions.

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breathe life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, those skilled in the art may recognize apparent, other equivalent, or alternative methods of implementing beacon integration technologies throughout venues which may generally relate to point of sale (POS) mobile and computer application and location based services, according to the present invention. Various aspects of the invention have been described above by way of illustration, and the specific embodiments disclosed are not intended to limit the invention to the particular forms disclosed. The particular implementation of the Light-Life application services may vary depending upon the particular contexts or applications, referencing by way of example, without limitation, zoning, digital keying, scanning, processing, and mapping, pricing, and triggering actions. By way of example, and not limitation, the Light-Life application services described in the foregoing were principally directed to mobile platform beacon accessibility implementations; however, similar techniques may instead be applied to the following services and structures: governmental agencies, restaurants, bars, and clubs, airports, rental car agencies, and applications support services to deliver innovative customer solutions. Similar techniques may instead also be applied to the following services and structures: Merging professional and technical services together in the support of customer-based managed service engagements, recommended customer services via social media combined with corporate management programs which result in customer satisfaction and return business, mobile services capabilities which may provide access to a level of service customization, cloud computing identification management capabilities to assist with the preservation of potentially relevant electronically stored information ("ESI") and reviews of such information by which implementations of the present invention are contemplated as within the scope of the present invention. In addition, similar techniques may also be applied to variances in platform design, by way of example and not limitation, Night-Life Application (Bars And Clubs), Light-Life (Retail/Everyday Use) Application, Light-Home Application (Home Building), and MyGov Application (Government), Fly-Light Application (Airports), and Express Pay. It is also contemplated that wearable technology may be implemented in the Light-Life Application as a complement to the system. In addition, it is also contemplated that another useful design would be to allow the user of the Light-Life Application to purchase products directly at the POS, but from a mobile phone which may not use geo-location technologies.

The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A Light-Life system comprising:
a Venue, in which said Venue comprises at least one beacon sensor and a computer implemented application, wherein information about products or products and services associated with the Venue are added or removed from said computer implemented application by said Venue, and wherein said Venue is configured to assign at least a service zone for a predetermined location;
a user/customer client device configured to communicate with a user/customer, wherein said user/customer client device is configured to communicate with said at least one beacon sensor of said Venue, in which said user/customer client device comprises a mobile client device and a mobile device application that is updated with said product or product and service information of said Venue that said mobile client device is currently in;
a Location Awareness Database, wherein said Location Awareness Database is configured to save at least a location of said user/customer client device, a created group, said set service zone, and a place setting for closing at least one of a single Tab and a plurality of Tabs;
a Location Awareness Module, wherein said Location Awareness Module is configured to track said user/customer client device and notify said user/customer when exiting said set service zone, and wherein said Location Awareness Module is further configured to close said single tab or plurality of Tabs automatically when said user/customer performs at least one of exiting said set service zone, is inactive for a predetermined period of time, and logs out of the system, and wherein locations associated with said products are tracked by said user/customer client device, and wherein information indicating the location of the user/customer and information of the tracked products available at the location of said user/customer client device are displayed on the user/customer client device;
a Web Server, wherein said Web Server is configured to allow said Location Awareness Module and said at least one beacon sensor and computer implemented application of said Venue to track said user/customer client device and establish connection with said user/customer client device;
a Music Coordinator Module, wherein said Music Coordinator Module is configured to allow said computer implemented application of said Venue to connect said user/customer client device to a DJ client device, and wherein said Music Coordinator Module is further configured to allow said user/customer to send messages to said DJ client device to request songs, in which a profile of said DJ is shown to said user/customer when connecting and messaging;
an Open Tab/Close Tab Module, wherein said Open Tab/Close Tab Module is configured to allow said computer implemented application of said Venue to process an order or request of at least one product or service of the user/customer, in which said product or service comprises at least one of a list of different types of alcoholic drinks, specials, top drinks, food, and recent orders from said Venue, and wherein said Open Tab/Close Tab Module is further configured to update said product or service menu of another Venue when said user/customer changes location to said another Venue;

a Bar Messenger Module, in which said Bar Messenger Module comprises an app messenger being configured to allow said user/customer client device to send at least a message to a peer client device;

a Service Rep Module, wherein said Service Rep Module is configured to locate said user/customer after the user/customer orders or purchases said product or service and track the location of said user/customer client device; and a Gift Drinks Module, wherein said Gift Drinks Module is configured to allow said user/customer to send drinks to other users/customers by profile information, in which said profile information of said other users/customers is displayed on said user/customer client device, and wherein said Gift Drinks Module is configured to allow said user/customer client device to turn off the ability to send or receive drinks.

2. The Light-Life system of claim 1, further comprising a Loyalty Program Module, in which said Loyalty Program Module is configured to give said computer implemented application of said Venue access to an awards program where said user/customer earns points at said Venue location, wherein said points are used to redeem products or services.

3. The Light-Life system of claim 1, further comprising a Mobile Marketing Module configured to allow said computer implemented application of said Venue to send messages to said user/customer client device in real time about services, promotion's and Venue information.

4. The Light-Life system of claim 1, further comprising an order display system, wherein said order display system is configured to allow a bar or store personnel of said Venue to view said user/customer product purchase or order.

5. The Light-Life system of claim 1, further comprising a Payment Module configured to allow said user/customer to enter card information and pay or buy said product or service.

6. The Light-Life system of claim 4, further comprising an Inventory Tracking Module being configured to allow said bar or store personnel to note what product or service is out of stock or needs to be restocked, in which said Inventory Tracking Module is further configured to highlight or recommend at least one product or service for said user/customer to order or purchase.

7. The Light-Life system of claim 1, further comprising a Social Media Module configured to allow said user/customer to post at least a message to a social media site.

8. The Light-Life system of claim 1, further comprising a Bar Analytics Module configured to give said Venue at least data on interworking and atmosphere at said Venue location, in which said Bar Analytics Module is further configured to provide information on sales and orders operable for a said Venue location to actively manage sales and traffic, and in which said Bar Analytics Module is further configured to provide said user/customer client device a product or service demand to assist in stocking and restocking of products and services.

9. The Light-Life system of claim 1, further comprising a Bar Messenger Database being configured to store order or purchase requests of said user/customer, wherein said Bar Messenger Database is further configured to recognize said user/customer order or purchase request history, in which said Bar Messenger Database comprises an application messenger for said user/customer to send messages or find friends, peers, or associates at a Venue location.

10. The Light-Life system of claim 1, further comprising an integrated order management system server, in which said integrated order management system server comprises at least a store menu and location lookup data, wherein said store menu and location lookup data being configured to allow a user/customer to view a Venue menu and location data.

11. A Light-Life application comprising:
a Venue, in which said Venue comprises at least one beacon sensor and a computer implemented application, wherein at least product or service information about products and services associated with the Venue are added or removed from said computer implemented application by said Venue, and wherein said Venue is configured to assign at least a service zone for a predetermined location;

a user/customer client device configured to communicate with a user/customer, wherein said user/customer client device is configured to communicate with said at least one beacon sensor of said Venue, in which said user/customer client device comprises a mobile client device and a mobile device application that is updated with said product or service information of said Venue that said mobile client device is currently in;

a Location Awareness Database, wherein said Location Awareness Database is configured to save at least a location of a said user/customer client device, a created group, said set service zone, and a place setting for closing at least one of a single Tab and a plurality of Tabs;

a Location Awareness Module, wherein said Location Awareness Module is configured to track said user/customer client device and notify said user/customer when exiting said set service zone, and wherein said Location Awareness Module is further configured to close said single tab or plurality of Tabs automatically when said user/customer performs at least one of exiting said set service zone, is inactive for a predetermined period of time, and logs out of the system, and wherein a location associated with said product or service is tracked by said user/customer client device, and wherein information indicating the location of the user/customer and information of the tracked products available at the location of said user/customer client device are displayed on the user/customer client device;

a Web Server, wherein said Web Server is configured to allow said Location Awareness Module and said at least one beacon sensor and computer implemented application of said venue to track said user/customer client device and establish connection with said user/customer client device;

a Music Coordinator Module, wherein said Music Coordinator Module is configured to allow said computer implemented application of said individual Venues to connect said user/customer client device to a DJ client device to request songs, and wherein said Music Coordinator Module is further configured to allow said user/customer client device to send messages to said DJ client device, in which a profile of said DJ is shown to users when connecting and messaging;

an Open Tab/Close Tab Module, wherein said Open Tab/Close Tab Module is configured to allow said computer implemented application of said Venue to process an order or request of at least one product or service of the user/customer, in which said product or service comprises at least one of a list of different types of alcoholic drinks, specials, top drinks, food, and recent orders from said Venue, and wherein said Open Tab/Close Tab Module is further configured to update the product menu when said user/customer changes location to another Venue;

a Bar Messenger Module, in which said Bar Messenger Module comprises an app messenger being configured to allow said user/customer client device to send at least a message to a peer client device;

a Service Rep Module, wherein said Service Rep Module is configured to locate said user/customer after the user/customer orders or requests said product or service and track the location of said user/customer client device;

a Gift Drinks Module, wherein said Gift Drinks Module is configured to allow said user/customer to send drinks to other users/customers by profile information, in which said profile information of said other users/customers is displayed on said user/customer client device, and wherein said Gift Drinks Module is confuted to allow said user/customer client device to turn off the ability to send or receive drinks; and an Inventory Tracking Module, said Inventory Tracking Module being configured to allow bar or store personnel to note what product or service is out of stock or needs to be restocked, in which said Inventory Tracking Module is further configured to highlight or recommend at least one product or service for said user/customer to order or purchase.

12. The Light-Life application of claim 11, further comprising a Bar Messenger Database being configured to store order or purchase requests of said user/customer, wherein said Bar Messenger Database is further configured to recognize said user/customer order or purchase request history, in which said Bar Messenger Database comprises an application messenger for said user/customer to send messages or find friends, peers, or associates at a Venue location.

\* \* \* \* \*